United States Patent [19]
Sakai

[11] Patent Number: 4,928,304
[45] Date of Patent: May 22, 1990

[54] ELECTRONIC SWITCHING SYSTEM CONNECTED TO AN EXTERNAL COMPUTER

[75] Inventor: Hiroshi Sakai, Tokyo, Japan

[73] Assignee: NEC Corporation, Tokyo, Japan

[21] Appl. No.: 240,640

[22] Filed: Sep. 6, 1988

[30] Foreign Application Priority Data

Sep. 4, 1987 [JP] Japan ............................. 62-222429

[51] Int. Cl.[5] ...................... H04M 3/42; H04M 11/08
[52] U.S. Cl. ...................................... 379/94; 379/96; 379/207
[58] Field of Search ................. 379/269, 201, 207, 96, 379/94

[56] References Cited

U.S. PATENT DOCUMENTS 4,210,782  7/1980  Fujita ................................. 379/269
4,710,952 12/1987  Kobayashi ......................... 379/269

FOREIGN PATENT DOCUMENTS

AU-B-
46699/85  3/1986  Australia .
0180268   9/1985  Japan ................................. 379/201
2165420   4/1986  United Kingdom ............... 379/201

OTHER PUBLICATIONS

"Computer Control of Switching", C. J. Hughes, *Electronics & Power*, vol. 23, No. 10, Oct. 1977, pp. 806–811.
"Dimension PBX: Advances For Today, Transitions To Tomorrow", R. S. Divakaruni et al., *Bell Laboratories Reard*, vol. 60, No. 9, 1982, pp. 254–259.
"Gazing into the SPC Network Future Reveals Vista Of New Features", T. H. Gordon et al., *Telephony*, Feb. 21, 1983, pp. 86,88,93.
"System 12 Network 2000 Evolution in the United States", R. E. Pickett, *Electrical Communication*, vol. 59, No. 1/2, 1985, pp. 188–194.

*Primary Examiner*—Thomas W. Brown
*Attorney, Agent, or Firm*—Foley & Lardner, Schwartz, Jeffery, Schwaab, Mack, Blumenthal & Evans

[57] ABSTRACT

An electronic switching system includes a private branch exchange (PBX), an external computer, and individual telephone terminals. Programs necessary for standard switching functions are stored in a memory in the PBX. Programs that apply to only a portion of the individual telephone terminals, called service functions, are stored in the external computer. Alteration of the various service functions is accomplished by altering application programs in the external computer, thus avoiding the need to alter programs in the PBX when individual terminals need changes.

2 Claims, 11 Drawing Sheets

TERMINAL MODE SET FACILITY

TERMINAL MODE RESET FACILITY

KEY-CODE TRANSFER FACILITY

NUMBER TRANSFER FACILITY

TERMINAL CONTROL FACILITY

SWITCH CONTROL FACILITY

ELECTRONIC SWITCHING SYSTEM CONNECTED TO AN EXTERNAL COMPUTER

BACKGROUND OF THE INVENTION

1. Field of the invention

The present invention relates to an electronic switching system connected to an external computer and thereby enabled to be controlled by this computer.

2. Description of the prior art

A conventional electronic switching system such as a private branch exchange (PBX) provides its users with various services by the use of internally stored programs in addition to its principal function of telephone switching. For instance, a switching system described in the Australian Patent AU-B-46699/85 controls various services with a computer (service processing unit) provided within a switching apparatus.

Meanwhile, along with the diversification of such services, there are increasing requirements for processing large quantities of data over many hours. Among known electronic switching systems designed to meet these requirements, there is one which causes a built-in service processing unit to send information to an external processing unit, which processes that information, and to execute the service functions, with the results of processing returned from the external processing unit.

Referring to FIG. 1 such a switching apparatus 800 has a telephone terminal interface 811, an information receiver 812, a state controller 813, a data memory 814, a computer interface 815 and a service processing unit 816.

The terminal interface 811 connects a telephone terminal 820 by way of a telephone line 82 and transfers, for instance, push-button information from the terminal 820 to the information receiver 812 or, conversely, display information for a lamp or character display to the terminal 820 from the state controller 813. In the data memory 814 is stored, for example, subscriber information.

The computer interface 815 connects an external computer 90 through a dedicated line 83, and links information to be transferred between the service processing unit 816 and the computer 90 by a prescribed way of conversion.

The service processing unit 816, receiving a demand for service processing, for instance, through the information receiver 812 in response to functional push-button information from the terminal 820, demands required information, by the use of the program for the demanded service, from the state controller 813 and the data memory 814, receives that information, and thereby executes processing of the information. The switching apparatus 800, as its information processing capacity and information storage capacity are limited, has the computer 90 execute the kind of processing which permits the use of a general-purpose program or processing which takes a long time to accomplish, or store a large quantity of information resulting from processing. The computer 90 receives information from the line 83, processes it, transmits prescribed resultant information and, at the same time, stores prescribed information.

This procedure will be described now with reference to FIGS. 1 and 2 together.

First, when one of the service functions is designated (step S51) with a functional button on the terminal 820, the information receiver 812 receives the service designation via the interface 811, identifies the kind of service designated and correspondingly drives the service processing unit 816 (step S52). The unit 816 transmits state control information to the terminal 820 via the state controller 813 and the terminal interface 811, and demands information required for service processing by displaying a message on the character display of the terminal 820 (step S53). The user pushes the proper button(s) in accordance with the displayed message. In response to the sending of push-button information from the terminal 820 (step S54), this information is transferred to the service processing unit 816 (step S55) to undergo processing (step S56). When processing by the computer 90 is temporarily needed in the middle of service processing, the service processing unit 816 transmits the processing demand to the computer 90 via the interface 815 and the line 83 (step S57) to actuate an information processing unit (step S58). The computer 90, having accepted this processing demand, transmits demand acceptance information to the switching apparatus 800 (step S59). Upon receipt of the demand acceptance information, the service processing unit 816 makes ready the information to be processed (step S60) and transfers it to the computer 90 (step S61). The computer 90 processes the received information (step S62), stores necessary information, and reports the result of processing to the service processing unit 816 by way of information transfer (step S63). The service processing unit 816 further processes the received result (step S64) to complete service processing, and reports the result on the character display of the terminal 820 (step S65). As the satisfied user presses the service disengagement button (step S66), the service processing unit 816 receives a service disengagement demand (step S67), disengages the service designation (step S68) and reports the disengagement to the terminal 820 (step S69).

Having received the result report at step S63, the service processing unit 816 demands the computer 90 to disengage (step S70), causes it to release the processing unit (step S71) and receives the report of disengagement (step S72). To sum up, the prior art system, even though using an external computer, uses the computer merely as an external memory or for auxiliary processing.

Since the electronic switching apparatus by the prior art has within itself a service processing unit for the execution of various service functions, the software structure of the switching apparatus, as illustrated in FIG. 3, has integrated the basic program for performing various basic functions of the switching apparatus (including dial/key information discrimination and network switch connection) and various application programs for the extra service functions. Therefore, addition or alteration of any service function would require revision of all the software used for the switching apparatus. Furthermore, since every user has different requirements, the software has to be tailored to individual users' needs, resulting in the disadvantage that the switching system cannot be standardized.

SUMMARY OF THE INVENTION

An object of the present invention is, therefore, to provide an electronic switching system cleared of the aforementioned problems of the prior art by mounting individualized programs, one for each user, on an external computer and the program for basic functions on an exchange apparatus. Thus the system according to the present invention achieves a common structure for the switching apparatus, which facilitates alteration of various service functions by altering application programs in the external computer.

Another object of the invention is to provide an electronic switching system to make the PBX controllable from the external computer by making some of the unit functions in input/output processing of the switching apparatus utilizable by the external computer through a computer interface.

Still another object of the invention is to provide an electronic switching system permitting of development application programs for achieving service functions of the PBX on any computer, irrespective of its make, in the hands of the user by choosing a general-purpose interface as the aforementioned computer interface.

In order to achieve the objects stated above, the present invention provides an electronic switching system having a network switch, telephone terminals, and a memory and control means for achieving mutual connection between the telephone terminals connected to the network switch in accordance with a program stored in the memory. The switching system further includes:

an external computer connected to said control means through a computer interface, and data transmission path setting means provided for setting a data transmission path between said computer and said terminals so that some of the functions for input/output processing performed by said control means can be utilized by programs of said external computer via said interface. The path setting means thus enables said computer to control the operations of said telephone terminals.

BRIEF DESCRIPTION OF THE DRAWINGS

The above objects and features of the present invention will be more apparent from the following detailed description when taken in conjunction with the accompanying drawings, in which.

In the drawings, the same reference numerals denote respectively the same structural elements.

DETAILED DESCRIPTION OF THE PREFERRED EMBODIMENT

Figure 4:
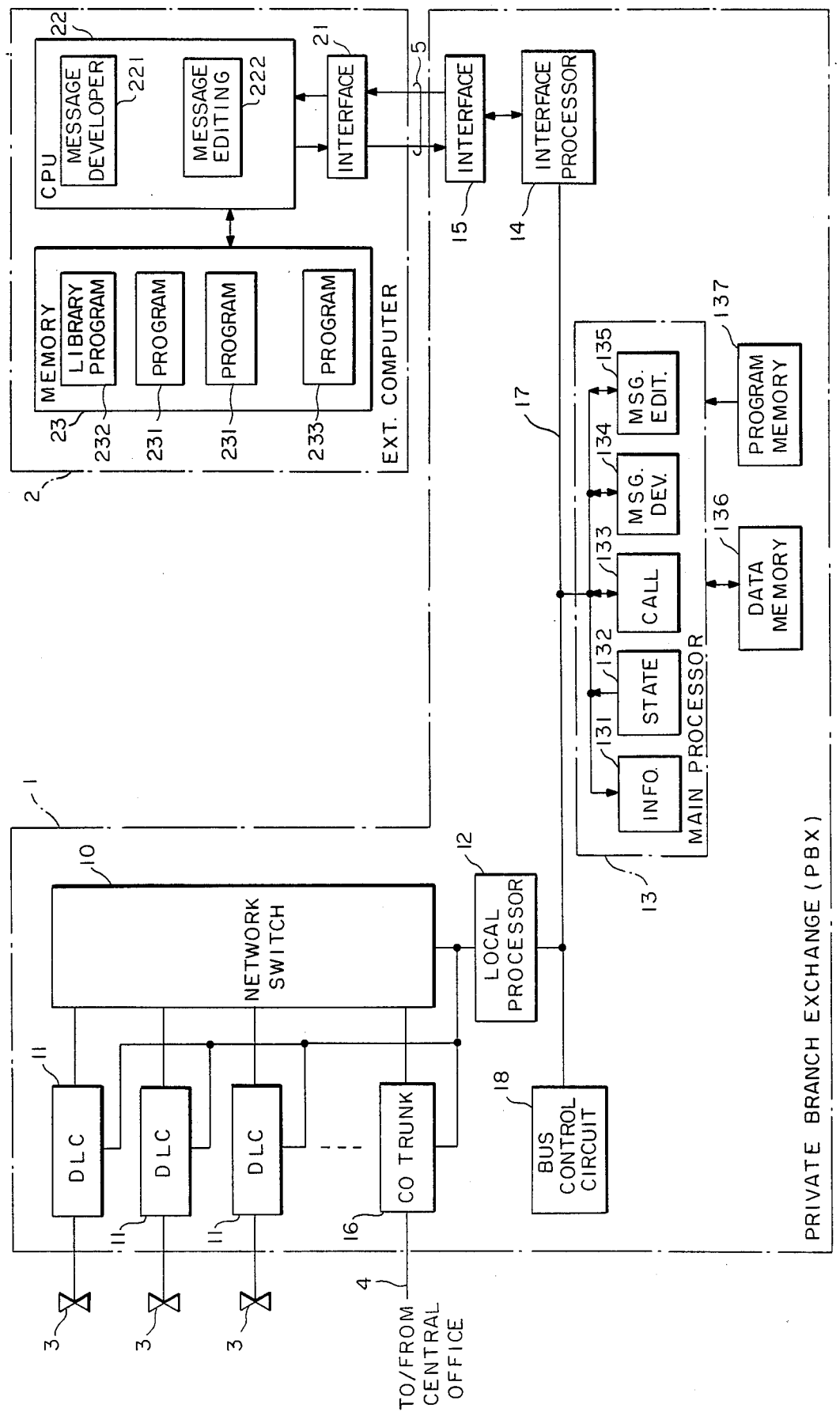
FIG. 4 is a block diagram showing a preferred embodiment of the invention.

Referring to FIG. 4, a preferred embodiment of the present invention is provided with a plurality of multifunctional telephone terminals 3, a private branch exchange (PBX) 1 for accommodating these terminals 3 and at least one central office line 4 from a central office; and an external computer 2 as a service processing unit, connected to the PBX 1 and providing various services to the switching system. The PBX 1 and the computer 2 are connected by computer interfaces 15 and 21 and by a bus 5. The computer 2 can freely control each part of the PBX 1 and the terminals 3 via the interfaces 15 and 21.

Figure 5:
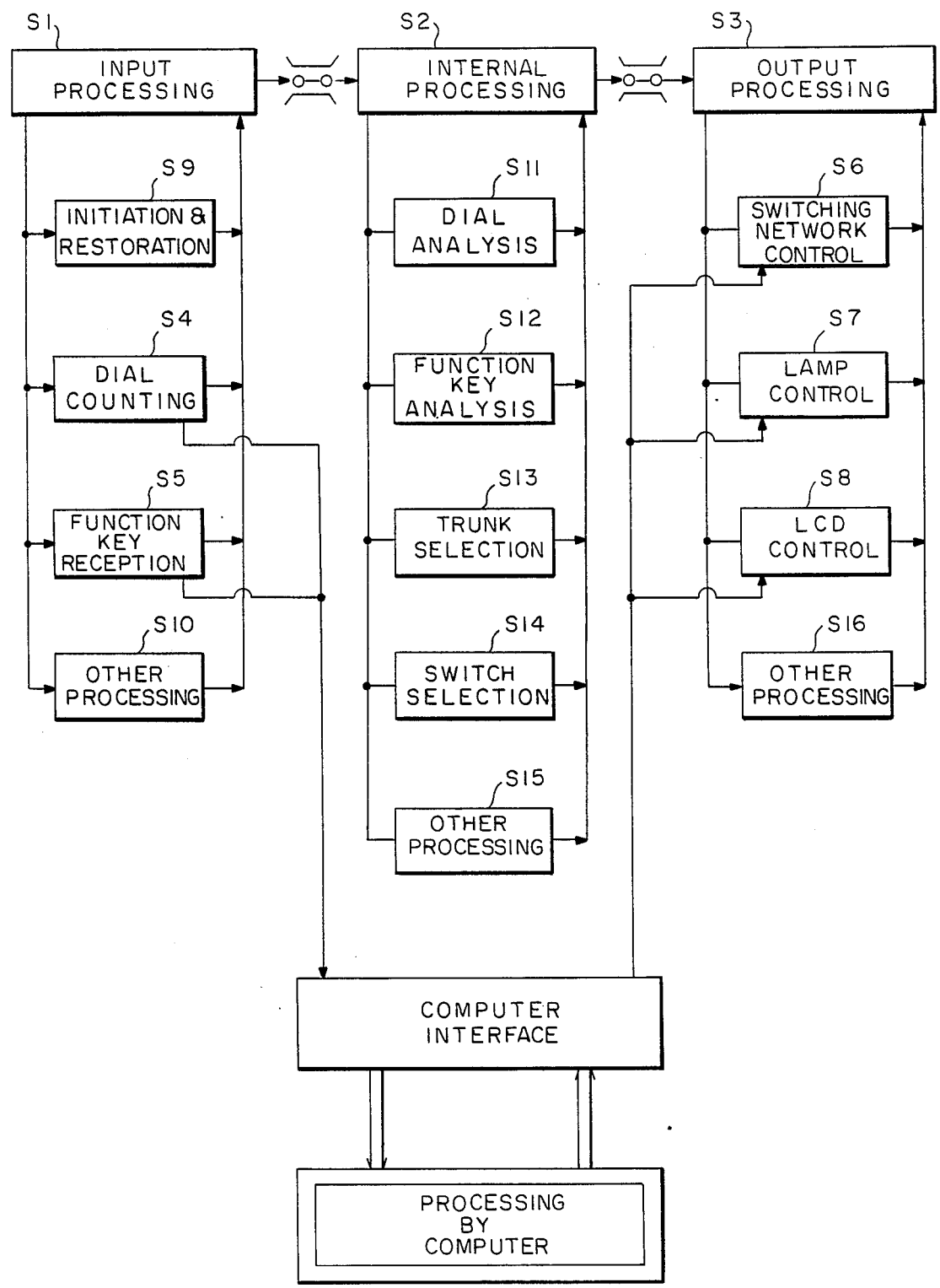
FIG. 5 is a diagram for explaining a concept of the invention.

Before describing the detailed structure of the embodiment illustrated in FIG. 4, the principle of the invention will be explained with reference to FIG. 5. Processing in a PBX is conventionally classified into three broad categories of input processing S1, internal processing S2 and output processing S3. For instance, input processing S1 includes monitoring of call initiation and restoration (S9), dial numeral counting (S4), function key information reception (S5) and other processing (S10); internal processing S2 includes dial numeral analysis (S11), function key information analysis (S12), trunk selection (S13), switch selection (S14) and other processing (S15); and output processing S3 includes switching network control (S6), lamp control (S7), LCD control (S8) and other processing (S16). A call or an event demand detected by input processing S1 is analyzed, discriminated and appropriately processed by internal processing S2, and output processing S3 achieves switch control and lamp control among other things. In the present invention, unit functions for opening to the external computer 2 are set in advance in input processing S1 and output processing S3 (S4 to S9, etc. in FIG. 5) to make possible direct control from the external computer 2 through the computer interface 15. As a result, when one of the various extra service functions is used, input key information, for instance, can be analyzed and processed by the computer 2 instead of being processed within the PBX 1, and the result of processing can be displayed by LCD control on the terminals 3 accommodated into the PBX 1. Whereas this concerns a service function previously performed by an application program (i.e. not included in the standard specification because every user would not require it), the processing which previously had to be done within the PBX is relegated to the external computer 2, so that only the basic functions required for a switching apparatus, or functions required by the standard specification are required to be performed in the PBX.

In the context of the present invention, the aforementioned unit functions concerning input/output processing, which are opened to the computer, are called facilities. Major facilities will be described below.

(1) Terminal mode set facility (MSF)

This is a function (corresponding to S4 and S5 in FIG. 5) to achieve, by pressing a function key or a dial code set for a particular service in advance at one of the terminals 3, initiation of the computer's application program for the pertinent service and setting of that terminal in a mode to operate as the terminal for that particular service (hereinafter called a terminal mode). This function establishes a communication path between the terminal 3 and the application program on the computer 2.

(2) Terminal mode reset facility (MRF)

This is a function (corresponding to S4 and S5 in FIG. 5) to cancel the terminal mode upon key operation at one of the terminals 3 or upon instruction from an application program. By this cancellation, the communication path between the terminal 3 and the computer 2 is restored.

(3) Key-code transfer facility (KTF)

This is a function (corresponding to S5 in FIG. 5) to transfer, when one of the terminals 3 is in the terminal mode, i.e. when a service by the application programs in the computer 2 is in use, pressed function key information from the terminal 3 to the computer 2.

(4) Number transfer facility (NTF)

This is a function (corresponding to S4 in FIG. 5) to transfer, when one of the terminals 3 is set in the terminal mode, pressed dial information (numerical input) from the terminal 3 to the computer 2.

(5) Terminal control facility (TCF)

This is a function (corresponding to S7 and S8 in FIG. 5) to control the LCD's, lamps and the like of the terminals 3 upon instruction from an application program in the computer 2. This TCF can also be used for demanding NTF or KTF.

(6) Switch control facility (SCF)

This is a function (corresponding to S6 in FIG. 5) to connect or restore a network switch 10 of the PBX 1 in response to connection control information (the calling party's number and the like) from an application program in the computer 2.

Figure 1:
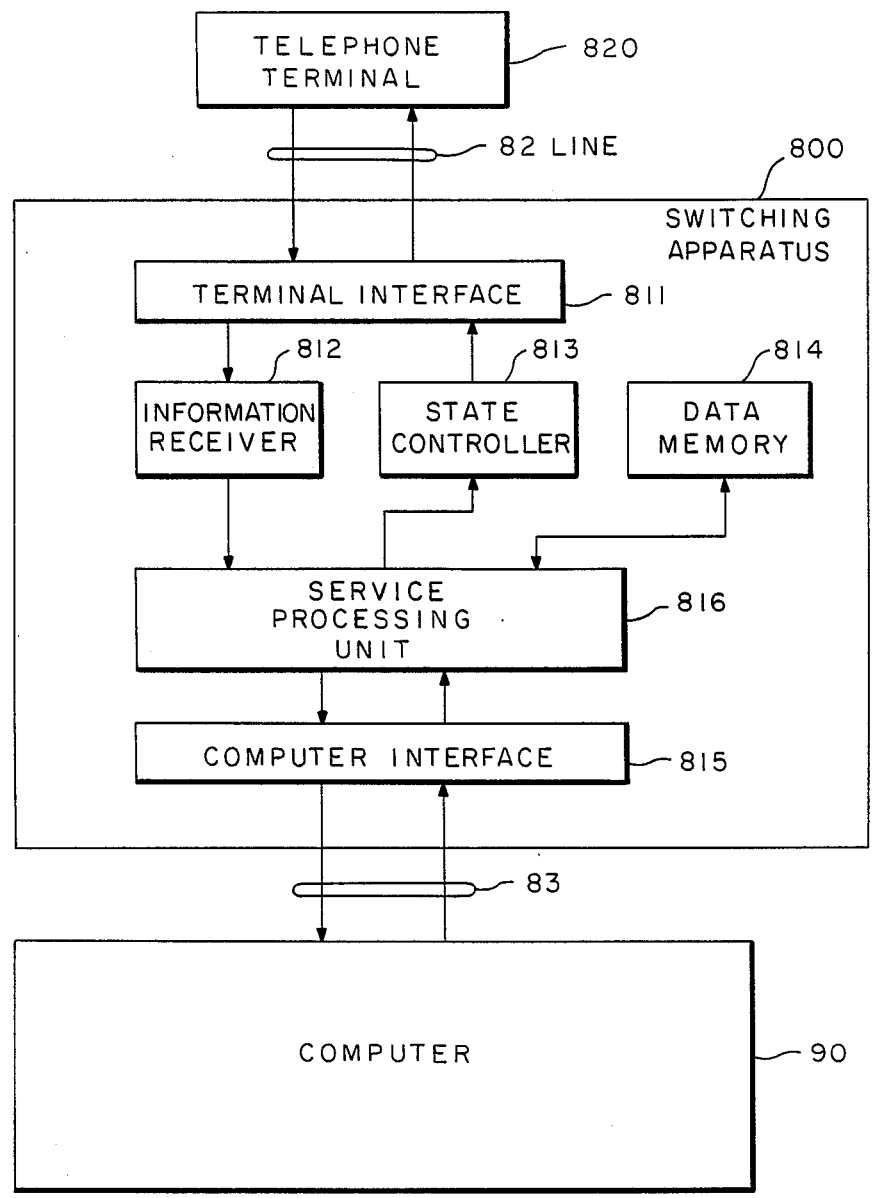
FIG. 1 is a block diagram showing a system by the prior art.
Figure 2:
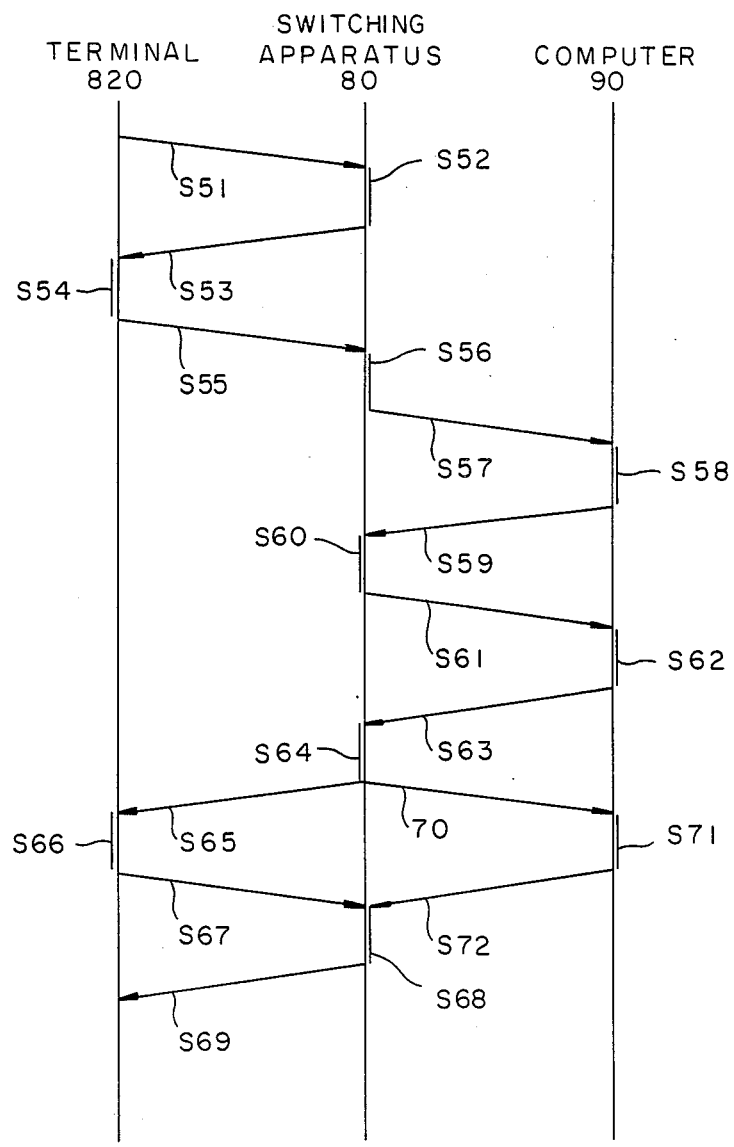
FIG. 2 is a sequential diagram of the operations of the system shown in FIG. 1.
Figure 3:
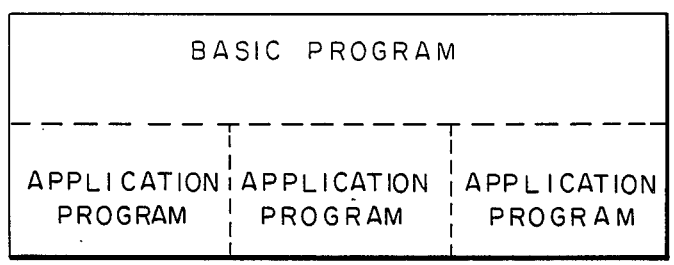
FIG. 3 is a schematic diagram of software for a prior art system.
Figure 6:
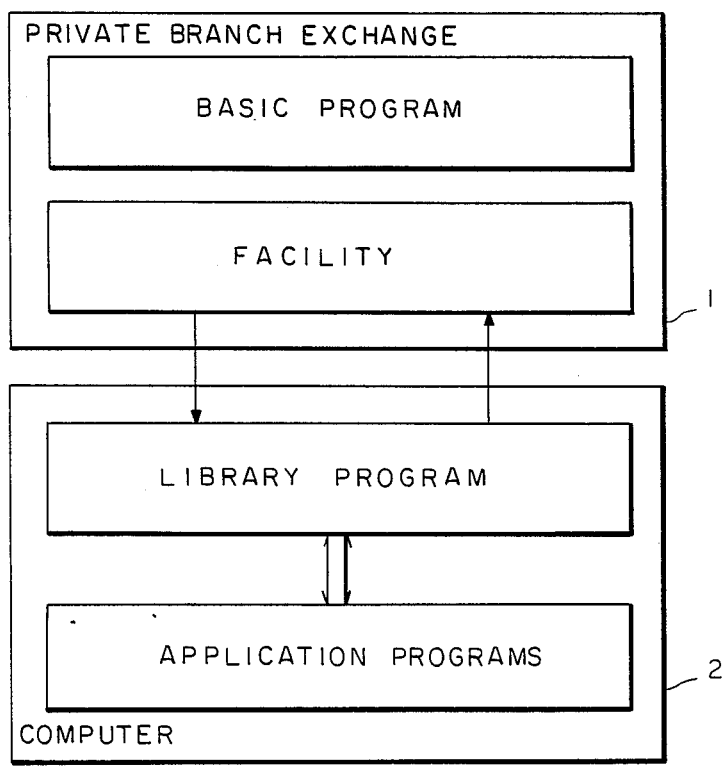
FIG. 6 is a schematic diagram of the software for a system according to the invention.

If it is made possible for the individual application programs in the computer 2 to use one or another of the aforementioned facilities as required, only the unified basic program for the switching apparatus as such and programs for these facilities will be needed in the PBX 1, whose structure is thereby made unifiable as shown in FIG. 6. Incidentally, the library program referred to in FIG. 6 is a program for controlling communication between application programs in the computer 2 and the above-mentioned facilities.

Referring back to FIG. 4 to describe the detailed structure of the preferred embodiment of the invention, the PBX 1 is provided with digital line circuits (DLC's) 11 each connected to one of the terminals 3; a CO trunk 16 connected to the central office line 4; the network switch 10 for accommodating these DLC's 11 and CO trunk 16; a local processor (LP) 12; a main processor (MP) 13 having a program memory 137 and a data memory 136; an interface processor 14; a bus control circuit 18 for controlling a processor bus 17 for connecting these processors 12, 13 and 14; and the computer interface 15 connected to the interface processor 14.

The DLC's 11, under the control of the local processor 12, send out voice information and terminal control information to the terminals 3 and, conversely, receive voice information, terminal state information and input information from the terminals 3 (details will be given later on). The CO trunk 16 has the functions of analog-to-digital (A/D) and digital-to-analog (D/A) conversion between analog voice signals on the central office line 4 and digital voice signals handled in the network switch 10. The network switch 10, under the control of the local processor 12, achieves mutual connection between the DLC's 11 and the CO trunk 16. The local processor 12 detects state variations in the DLC's 11 and the CO trunk 16, notifies the main processor 13 of the detected variations and requests the main processor 13 to process them. The main processor 13, receiving with its information receiver 131 state transition information from the local processor 12, discriminates the content of this information, performs processing with its call processing unit 133 on the basis of the discriminated content and, if state transition in any of the terminals 3, DLC's 11, switch 10 or trunk 16 is required, sends control information with its state controller 132 to the local processor 12. Thus the PBX 1 uses a functionally decentralized multiprocessor system, basically similar to the switching systems disclosed in the U.S. Pat. Nos. 4,710,952 and 4,210,782.

The main processor 13 has a message developer 134 and a message editor 135 for transmitting and receiving information which is required when the external computer 2 uses one or another of the facilities. Thus when using facility, various types of information transmitted to the computer 2 are assembled by the message editor 135 into a transmit message, which is transmitted via the interface processor 14, computer interface 15 and bus 5 and, conversely, a receive message from the computer 2 is developed by the message developer 134 with respect to each type of information (details will be described later on).

The interface processor 14 is a processor for relaying the transmission and reception of the message for the facility by the developer 134 and the editor 135 of the main processor (MP) 13 via the bus 17. The computer interface 15 is intended for interfacing with the computer 2.

The computer 2 has includes the interface 21 connected to the interface 15 of the PBX 1 via the bus 5, a central processing unit (CPU) 22 and a memory 23.

The interfaces 15 and 21 are circuits performing communication based on the Layer 2 (data link layer) conforming to the Open Systems Interconnection (OSI) prescribed by the International Organization for Standardization (ISO). In the memory 23 of the computer 2 are stored various application programs 231 for supplying various service functions to the terminals 3 via the PBX 1; a library program 232 for having transmission and reception of messages take place, when any of said facilities is in use, between the CPU 22 and the message developer 134 or the message editor 135 of the PBX 1 in accordance with the formats of the X.409 (presentation layer) prescribed by the International Telegraph and Telephone Consultative Committee (C.C.I.T.T.); and data 233 for various service functions. As the CPU 22 reads and executes the library program 232, there are provided a message developing function 221 and a message editing function 222 within the CPU 22.

Figure 7:
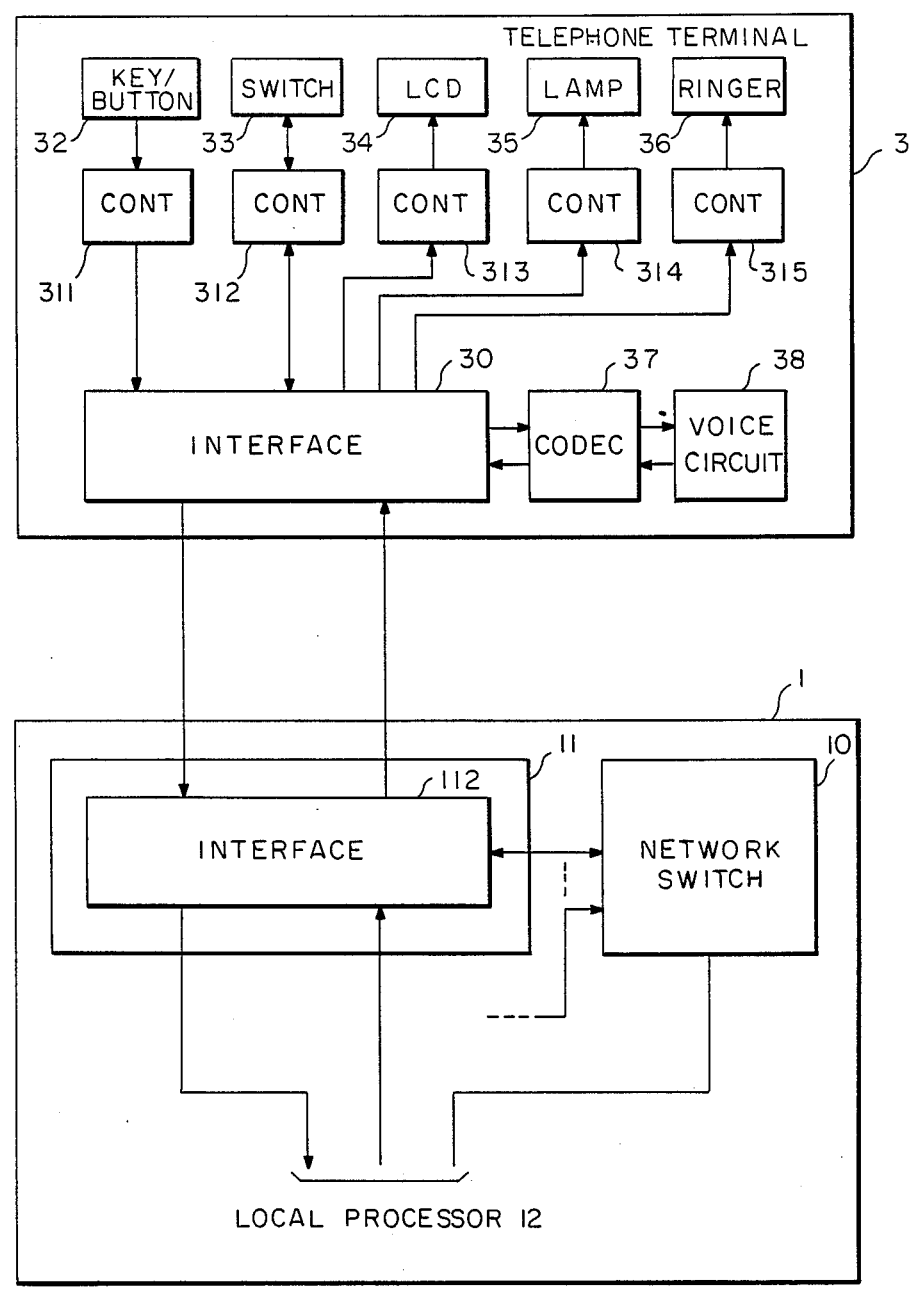
FIG. 7 is a block diagram showing a part of FIG. 4 in detail.
Figure 8A:
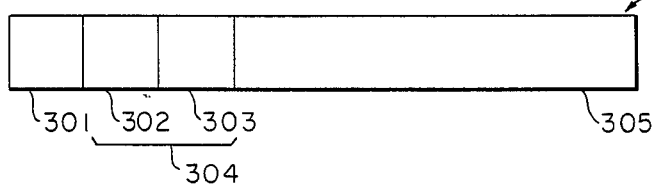
FIGS. 8(*a*) and 8(*b*) are diagrams showing examples of a data transmission formats in the arrangement shown in FIG. 7.
Figure 8B:
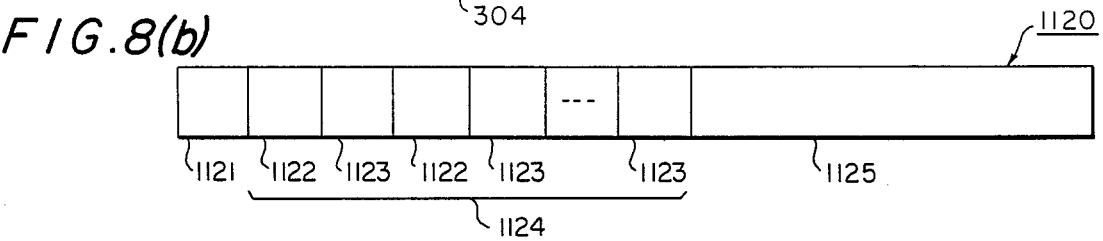

Now referring to FIG. 7, each of the terminals 3 has an interface 30 to be connected to an interface 112 in the corresponding DLC 11; a key/button controller 311 for detecting the pressing of a function key/dial button 32 and for outputting a key code or a dial code; a switch controller 312 for controlling various switches 33 such as a hook switch and/or a microphone switch; an LCD controller 313 for controlling an LCD 34; a lamp controller 314 for controlling lamps 35 of an LED and/or the like; a ringer controller 315 for controlling a ringer 36; and a CODEC 37 for performing A/D and D/A conversion between digital voice signals handled by the interface 30 and analog voice signals handled by a voice circuit 38 for telephone sets. Information 300 periodically sent from the interface 30 of the terminal 3 to the interface 112 of the PBX 1, as shown in FIG. 8(a), includes a frame discriminator 301 a control information 304 and a digital voice signal 305 from the CODEC 37. The information 304 comprises a discriminator 302 indicating the type of input information (for instance function key information, dial button information, and so forth), and a code 303 indicating the content of the information (for instance pressing of the No. 1 function key, pressing of the dial button "1", and so forth). The control information 304 is formulated from information from the controllers 311 to 315. When this information 300 is received by the interface 112, the control information 304 is sent to the MP 13 via the local processor (LP) 12 and, on the other hand, the voice signal 305 is inputted to the network switch 10 to undergo exchange processing. Conversely, information 1120 sent from the interface 112 to the interface 30, as shown in FIG. 8(b), integrates control information 1124 which, following a frame discriminator 1121, comprises many multiplexed sets of a discriminator 1122 for indicating the type of information (for instance ringer control, lamp control and LCD control) and a control content code 1123, each, and a digital voice signal 1125 from the network switch 10, and is sent out periodically. The control information 1124 is formulated from information sent from the MP 13 via the LP 12. When this information 1120 is received by the interface 30, the control content codes 1123 of the control information 1124 are supplied to the controllers 311 to 315 designated by the corresponding discriminators 1122, and the voice signal 1125 is D/A-converted by the CODEC 37 and sent to the circuit 38.

Next will be explained the aforementioned facilities actuated by the MP 13 in FIG. 4. The basic program and programs for the execution of the facilities in this system are stored in the program memory 137. The information transmitted and received between the unit 134 or 135 of the MP 13 and the computer 2 when a facility is started differs from facility to facility.

An example of information transfer format in each facility will be described below with reference to FIGS. 9(a) to 9(f). These formats, though simplified here to facilitate description, actually conform to the formats of the C.C.I.T.T..X.409. Thus, a header 900 corresponds to the invoke Operation Protocol Data Unit (OPDU) in X.409. In the MSF (FIG. 9(a)), information (a message) including a service class indicating code 901, assigned in advance to a key pressed at the terminal 3, and a terminal number 902 for identifying the corresponding terminal is sent from the PBX 1 to the computer 2. In the MRF (FIG. 9(b)), a message including the terminal number 902 indicating a terminal in the terminal mode and a code 903 indicating the MRF is sent from the PBX 1 to the computer 2 or from the computer 2 to the PBX 1. In the KTF (FIG. 9(c)), a message including the terminal number 902, a code 904 indicating the KTF and at least one of pressed key codes 905 to 906 is sent from the PBX 1 to the computer 2. In the NTF (FIG. 9(d)), a message including the terminal number 902, a code 907 indicating the NTF and at least one of pressed dial numbers 908 to 909 is sent from the PBX 1 to the computer 2. In the TCF (FIG. 9(e)), a message including the terminal number 902, a code 910 indicating the TCF and at least one of terminal control information 911 to 912 (for instance a discriminator for LCD control and a control content code) is sent from the computer 2 to the PBX 1. In the SCF (FIG. 9(f)), a message including a code 913 indicating the SCF, two terminal numbers 914 and 915 for connection and restoration, and a control content code 916 (distinction between connection and restoration or the like) is sent from the computer 2 to the PBX 1. When the developer 134 receives the SCF message via the interface 15 and the processor 14 and discriminates the SCF code 913, the information 914 to 916 is transmitted to the call processing unit 133. On the basis of processing by the call processing unit 133, control information of the network switch 10 is sent from the state controller 132 to the LP 12 to cause the network switch 10 to operate.

Figure 9A:
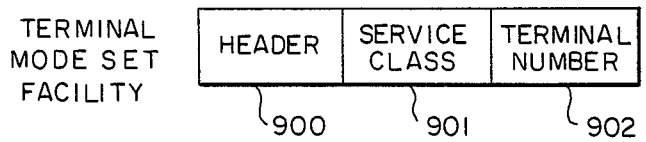
FIGS. 9(*a*) to 9(*f*) are diagrams showing examples of a data transmission formats in the arrangement shown in FIG. 4.
Figure 9B:
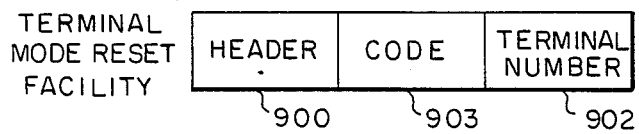
Figure 9C:
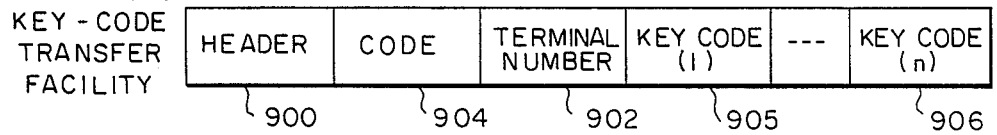
Figure 9D:
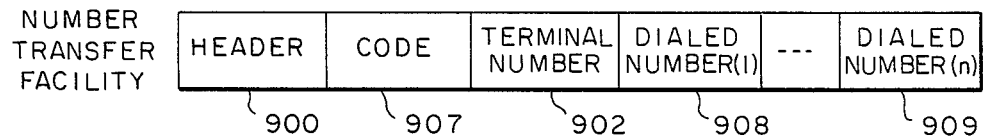
Figure 9E:
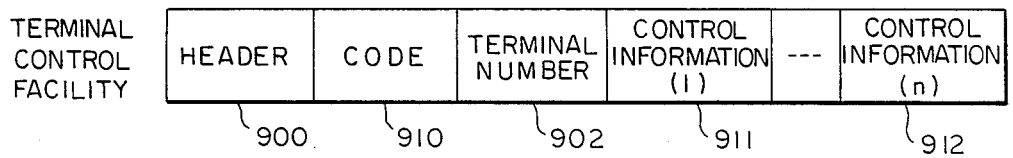
Figure 9F:
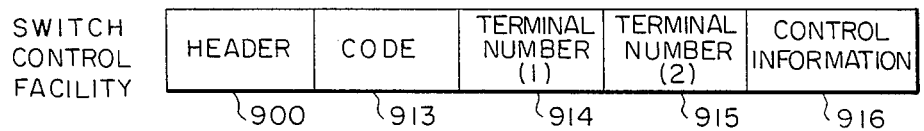

Incidentally, in the TCF (FIG. 9(e)), some of the control information 911 to 912 can be used as information to demand the MP 13 to start the KTF or the NTF. For instance, it may be so arranged that the presence or absence of such a demand be always indicated in a prescribed position in the TCF message. This format is used when the LCD or the like of the terminal 3 is caused to display characters demanding information required for service processing, and the user's response (input) is sent by the NTF or the KTF.

Figure 10:
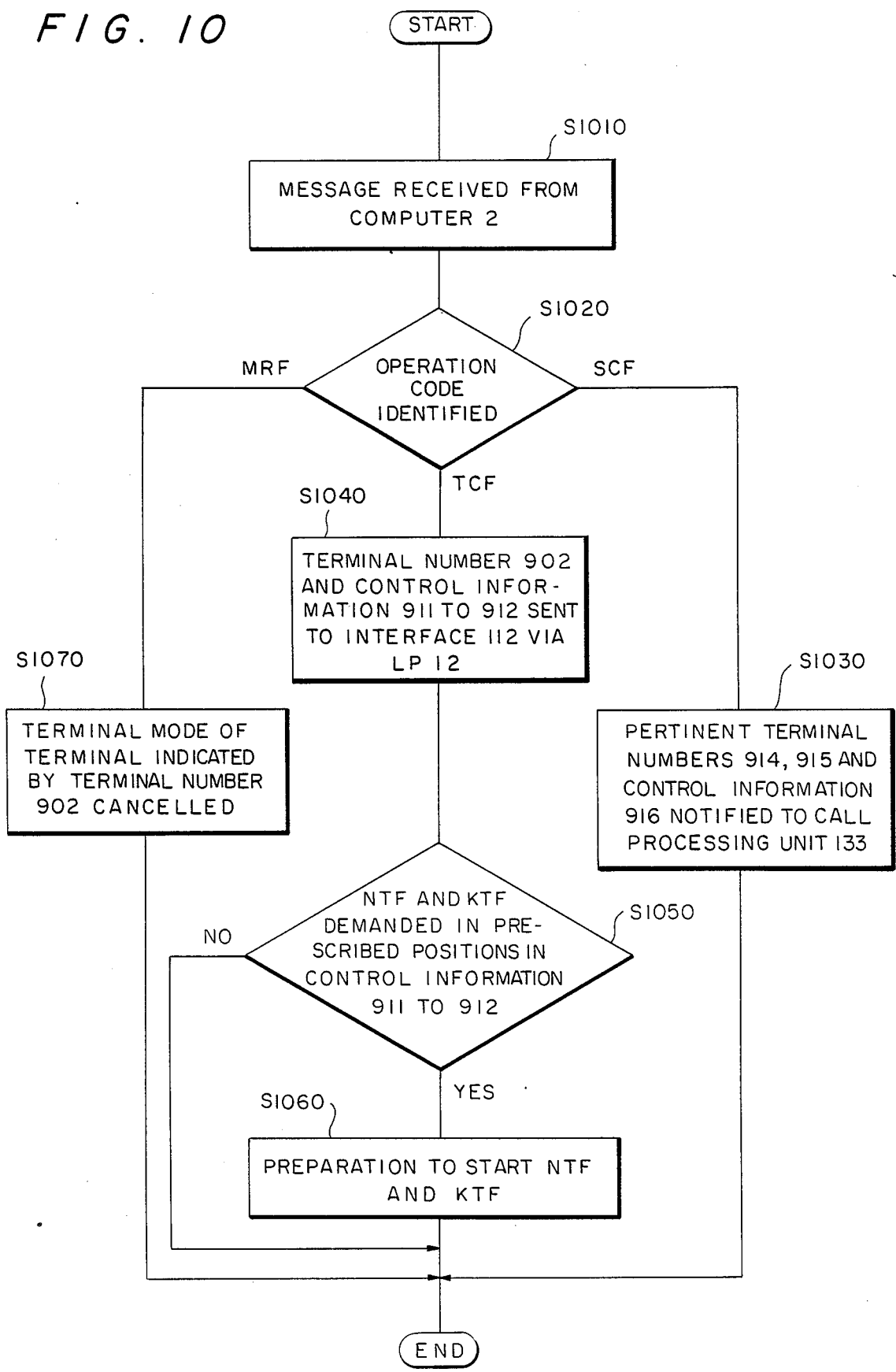
FIGS. 10 and 11 are flow charts of processing in message developers 134 and 221, respectively, in FIG. 4.
Figure 11:
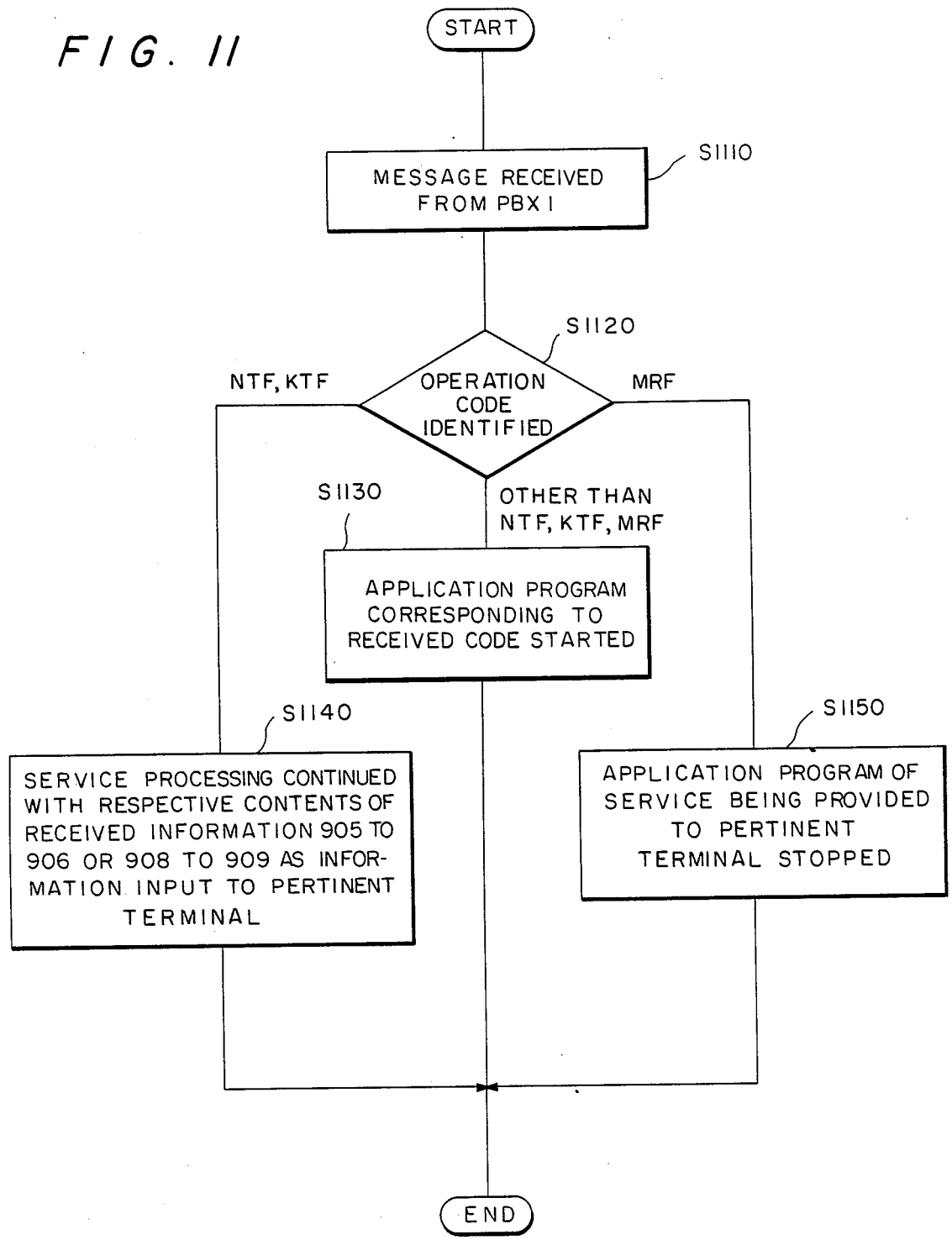

The codes 901, 903, 904, 907, 910 and 913, as operation codes, are in a position common to all the formats. Therefore in the message developers 134 and 221, the content of the demand can be understood by identifying the operation code of the message received. In FIGS. 10 and 11 is also shown how processing takes place in the message developers 134 and 221, respectively. Thus, with reference to FIG. 10, as a message is received by the message developer 134 from the computer 2 (step S1010), the aforementioned operation code is identified (step S1020) and, if it indicates the SCF, the call processing unit 133 is notified of the pertinent terminal numbers 914 and 915 and the control information 916, so that switch control information be sent from the state controller 132 to the LP 12 to control the network switch 10 (step S1030). If the code indicates the TCF, the terminal number 902 and the control information 911 to 912 are supplied to the interface 112 via the LP 12 to control the operation of the terminal 3 (step S1040). Meanwhile, the presence or absence of a demand for the NTF or the KTF is judged according to the information (for instance, 912) (step S1050) and, if one is present, starting is prepared for (step S1060). If the code indicates the MRF, the terminal mode of the pertinent terminal is cancelled (step S1070).

Meanwhile, referring to FIG. 11, when a message is received by the message developer 221 from the PBX 1 (step S1110), the operation code is identified (step S1120) and, if the code does not indicate the NTF, KTF or MRF, the application program designated by the received code is executed to start the pertinent service (step S1130). If the code indicates the NTF or KTF, service processing is performed with the received contents 905 to 906 or 908 to 909 as input information from the pertinent terminal required for service processing (step S1140). If the code indicates the MRF, the service so far provided to the pertinent terminal is ended (step S1150).

Incidentally, the message editors 135 and 222 formulate messages of one or another of the aforementioned formats corresponding to the actuated facility.

Figure 12:
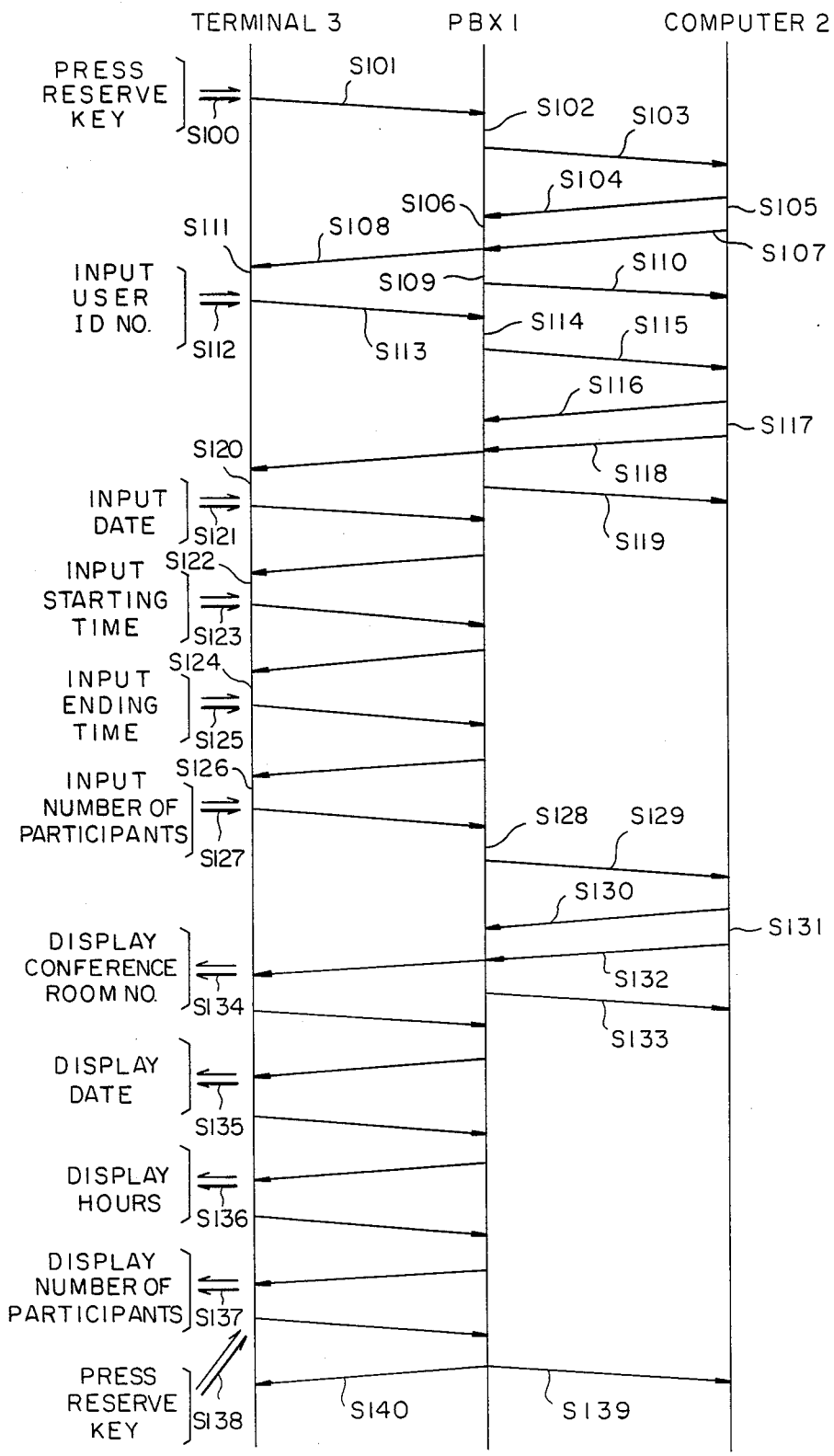
FIGS. 12 and 13 are, respectively, an operational sequence diagram of one example of a service function achieved by a system according to the invention and a diagram for explaining one example of a sequence of LCD messages therein.

Next will be described, referring to FIGS. 12 and 13, a conference room reservation service, which is one of the service functions achieved by the system of the present invention.

First, out of the keys or buttons 32 of a terminal 3, a button assigned for setting a reservation terminal mode of a conference room reservation service (hereinafter called the "reserve key") is pressed (step S100). This pressing is detected by the controller 311, and the fact of this detection is conveyed in the aforementioned data format (FIG. 8(a)) to the PBX 1 via the interface 30. This data is received by the interface 112 of the pertinent DLC 11, is received by the information receiver 131 of the MP 13 via the LP 12 and the bus 17 (step S101). As the MP 13 recognizes the pressed key to be the reserve key, depending on the data indicative of the correspondence between the assigned key and the application program stored in the data memory 136, the MSF is actuated (step S102), and a message in the MSF format (FIG. 9(a)) is formulated by the message editor 135 and is sent to the computer 2 via the bus 17, interface processor 14, interface 15 and bus 5 (step S103).

The computer 2 receives this message via the interface 21, and develops the received message with its message developing function 221. At this time, a response message indicating correct reception of the message (return result) is sent back to the PBX 1 (step S104). The CPU 22 identifies the discriminator (service code) 901 in the received message and starts the "reserve" processing of conference room reservation service in the application program 231 (step S105).

Meanwhile, having received the return result message, the MP 13 performs terminal mode setting for the conference room reservation service, for the pertinent terminal 3, in the data memory 136 (step S106).

As the conference room reservation service application program 231 begins to be processed, the TCF is actuated, and a message in the FIG. 9(e) format is prepared by the message editing function 222 and is sent to the PBX 1 (step S107). In this example, a demand for the user's ID Number (No.) is displayed on the LCD 34 as control information, and a message is also sent to actuate the NTF for transferring the corresponding input.

The MP 13 of the PBX 1 develops this message with its message developer 134 and, as it recognizes its content, sends the LCD control information for the terminal 3 from the state controller 132 to the interface 112 via the bus 17 and the LP 12, and further on to terminal 3 in the format of FIG. 8(b) (step S108). Meanwhile, the MP 13 achieves an input awaiting (ID No. input) state (step S109) to actuate the NTF, and returns a response associated with the pertinent terminal 3 (step S110).

As the demand for ID No. input is displayed on the LCD 34 of the terminal 3 (FIG. 13) (step S111) and the ID No. is inputted with the dial button 32 (step S112), dial information is sent to the receiver 131 of the MP 13 (step S113), the NTF is started, and a message (FIG. 9(d)) is formulated by the message editor 135 (step S114) and supplied to the computer 2 (step S115).

The CPU 22 of the computer 2, upon returning a message (step S116), checks the ID No. obtained by message development with the data base 233 and, if it is found correct (step S117), sends by means of the TCF control information, information for displaying on the LCD (in this case four kinds of serial display) for demanding necessary information for the conference room reservation and NTF starting demand information for awaiting an input from the terminal 3, both pieces of information in a single message (step S118).

The MP 13 of the PBX 1, upon returning a response (step S119), sends to the terminal 3 control information for successive displaying (FIG. 13) of an indicated series of items, i.e. a date input demand (step S120), a starting time demand (step S122), an ending time demand (step S124) and a number of participants demand (step S126) and, when all the corresponding inputs (steps S121, 123, 125 and 127) have been received, formulates the NTF message (step S128) to supply the computer 2 with the four kinds of input information together (step S129).

The CPU 22 of the computer 2, upon returning a response (step S130), processes registration of the conference room reservation (step S131), and sends to the PBX 1, in the TCF format, control information for displaying the result of processing (step S132).

Figure 13:
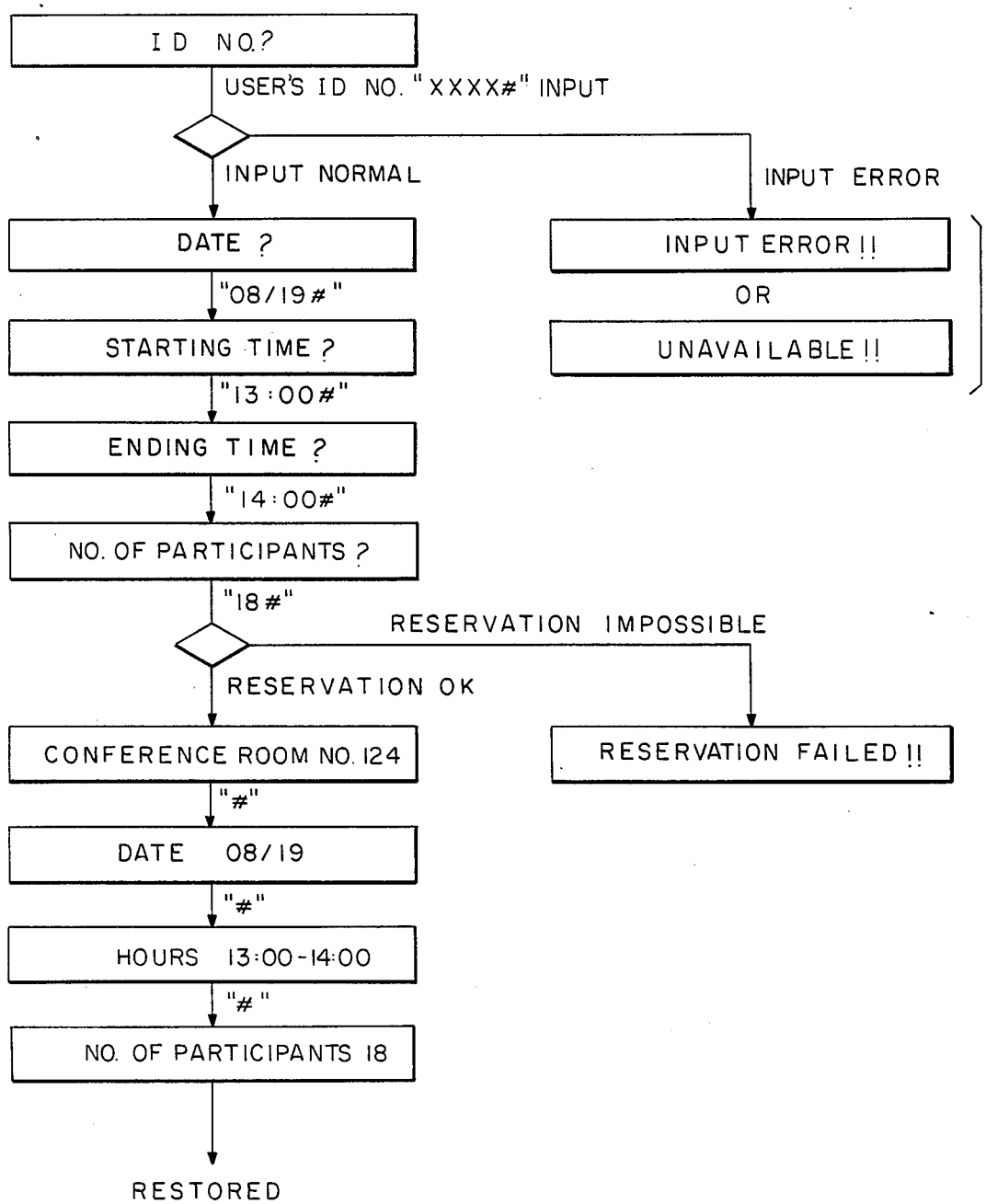

The MP 13, upon returning a response (step S133), sends LCD control information to have the LCD 34 of the terminal successively display the four kinds of processing results, i.e., the reserved conference room number (step S134), reserved date (step S135), reserved hours (step S136) and the number of participants (step S137) for whom the reservation is made as shown in FIG. 13. When the user, having completed the conference room reservation, again presses the reserve key (step S138), the MRF is actuated in the MP 13, having detected the repressing of the reserve key, and the sending of an MRF message brings the application program of the computer 2 for conference room reservation service to an end (step S139) and, at the same time, the terminal mode of the terminal 3 is cancelled (step S140). If any abnormality is found in the result of ID No. checking at step S117 or the reservation is impossible at step S131, the contents of the display will be changed as shown in FIG. 13.

As described before, it is made sufficient for the switching system itself has only its basic function, without requiring any service function. By so formulating the application programs of the computer 2 the computer 2 can directly control the internal circuits of the PBX 1 and the terminals 3 successively by combining various facilities, all open to use by the computer 2, and thereby executes the corresponding service functions.

What is claimed is:
1. An electronic switching system comprising:
 a plurality of telephone terminals having display means and key input means;
 an electronic exchange apparatus having a network switch for accommodating said telephone terminals, control means for achieving exchange service functions between said telephone terminals; and
 an external computer connected to said control means through a computer interface including an application program for providing non-telecommunication service functions unrelated to said exchange service functions;
 said control means including first facility means for initiating said application program in response to a key input operation at any of said telephone terminals and for setting a data transmission path to said external computer, second facility means for transmitting operated key data from any of said telephone terminals to said application program via said path when service by said application program is in use, third facility means for controlling said display means of any communicating one of said telephone terminals in response to an instruction from said application program when said service by said application program is in use; and
 whereby said application program initiated by said first facility means controls said telephone termi- nals as input/output terminals for said nontelecommunication service functions using said second and third facility means.

2. An electronic switching system, as claimed in claim 1, wherein said non-telecommunication service functions include a conference room reservation service function.

* * * * *